US007411728B2

(12) United States Patent
Diep et al.

(10) Patent No.: US 7,411,728 B2
(45) Date of Patent: Aug. 12, 2008

(54) DEVICES AND METHODS FOR RAMAN AMPLIFICATION AND DISPERSION COMPENSATION

(75) Inventors: Phong Diep, Horseheads, NY (US); James C. Fajardo, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/473,481

(22) Filed: Jun. 23, 2006

(65) Prior Publication Data

US 2006/0250680 A1    Nov. 9, 2006

Related U.S. Application Data

(62) Division of application No. 10/659,523, filed on Sep. 9, 2003, now Pat. No. 7,102,812.

(60) Provisional application No. 60/418,448, filed on Oct. 15, 2002.

(51) Int. Cl.
*H04B 10/17* (2006.01)
(52) U.S. Cl. .............. 359/337.5; 359/334; 385/127
(58) Field of Classification Search ............. None
See application file for complete search history.

(56) References Cited

U.S. PATENT DOCUMENTS 5,361,319 A * 11/1994 Antos et al. ............ 385/123
5,799,123 A    8/1998 Oyobe et al. ........... 385/124
5,887,104 A * 3/1999 Sugizaki et al. ......... 385/123

6,317,549 B1 * 11/2001 Brown ................... 385/123

(Continued)

FOREIGN PATENT DOCUMENTS

EP    1 083 446 A1    3/2001

(Continued)

OTHER PUBLICATIONS

Antos, et al. "Design and Characterization of Dispersion Compensating Fiber Based on the $LP_{01}$ Mode", Journal of LIghtwave Technology, vol. 12, No. 10, Oct. 1994, p. 1739-1745.

*Primary Examiner*—Deandra M. Hughes
*Assistant Examiner*—Ari M Diacou
(74) *Attorney, Agent, or Firm*—Svetlana Z. Short

(57) ABSTRACT

The present invention provides devices and methods for Raman amplification and dispersion compensation. According to one embodiment of the present invention, a dispersion compensating device includes a dispersion compensating fiber having a dispersion more negative than about −50 ps/nm/km over a wavelength range of about 1555 nm to about 1615 nm; a Raman gain fiber having a dispersion more positive than about −40 ps/nm/km over a wavelength range of about 1555 nm to about 1615 nm; and a pump source operatively coupled to the dispersion compensating fiber and the Raman gain fiber, the pump source operating at a pump wavelength, wherein the dispersion compensating fiber has a Raman Figure of Merit at the pump wavelength, and wherein the Raman gain fiber has a Raman Figure of Merit at least about equivalent to the Raman Figure of Merit of the dispersion compensating fiber, and wherein the dispersion compensating fiber and the Raman gain fiber are arranged in series between the input and the output of the device. The device provides higher Raman gain than a conventional Raman-pumped dispersion compensating device.

4 Claims, 4 Drawing Sheets

U.S. PATENT DOCUMENTS

| | | | |
|---|---|---|---|
| 6,707,976 B1* | 3/2004 | Gruner-Nielsen et al. | 385/123 |
| 6,879,763 B2* | 4/2005 | Mukasa | 385/127 |
| 6,959,137 B2* | 10/2005 | Kalish et al. | 385/127 |
| 7,076,139 B1* | 7/2006 | Aikawa et al. | 385/123 |
| 7,349,611 B2* | 3/2008 | Broeng et al. | 385/125 |
| 2001/0028775 A1* | 10/2001 | Hasegawa et al. | 385/127 |
| 2002/0191927 A1* | 12/2002 | Liu | 385/123 |
| 2003/0095769 A1* | 5/2003 | Aikawa et al. | 385/127 |
| 2004/0067032 A1* | 4/2004 | Sartori | 385/123 |
| 2004/0151510 A1* | 8/2004 | Tanaka et al. | 398/147 |
| 2004/0170437 A1* | 9/2004 | Hasegawa et al. | 398/148 |
| 2004/0179844 A1* | 9/2004 | Chung et al. | 398/82 |
| 2004/0202439 A1* | 10/2004 | Takahashi | 385/127 |
| 2004/0213531 A1* | 10/2004 | Sasaoka | 385/123 |
| 2006/0250680 A1* | 11/2006 | Diep et al. | 359/337 |

FOREIGN PATENT DOCUMENTS

| | | |
|---|---|---|
| EP | 1 195 627 A2 | 4/2002 |
| WO | WO 02/19576 | 3/2002 |

\* cited by examiner

DEVICES AND METHODS FOR RAMAN AMPLIFICATION AND DISPERSION COMPENSATION

This is a divisional of U.S. patent application Ser. No. 10/659,523 filed on Sep. 9, 2003 now U.S. Pat. No. 7,102,812 which in turn claims the priority date of the provisional application 60/418,448 filed on Oct. 15, 2002, the contents of which are relied upon and are incorporated by reference in their entirety, and the benefit of priority under 35 USC §120 is hereby claimed.

BACKGROUND OF THE INVENTION

1. Field of the Invention

The present invention relates generally to optical communications, and more specifically to devices and methods providing dispersion compensation and Raman amplification of an optical signal.

2. Technical Background

As the bit rates of optical communications systems increase, the deleterious effects of dispersion in the optical fibers used in long-distance transmission become increasingly important. Dispersion causes optical pulses to spread out in time; the lower wavelength components of the pulse travel along the fiber at a different rate than do the higher wavelength components of the pulse. Typically, long-distance transmission fibers (e.g. LEAF®, available from Corning Incorporated of Corning, N.Y.) have a small but non-negligible positive dispersion, causing the higher wavelength components to arrive at a network node before the lower wavelength components. This temporal spreading can cause loss of signal fidelity and an increase in bit error rate.

Conventional methods of dispersion compensation use dispersion compensating fiber to reverse the effects of dispersion in the transmission fiber. Dispersion compensating fiber typically has a large negative dispersion to counteract the positive dispersion of the transmission fiber. In one type of conventional dispersion compensating device, a dispersion compensating fiber is packaged on a spool in a module. The length and dispersion properties of the dispersion compensating fiber are chosen to balance the dispersion of the span of transmission fiber to which it is coupled. A positively chirped optical signal from the transmission fiber is propagated through the dispersion compensating fiber, and the negative dispersion of the dispersion compensating fiber removes the positive chirp from the optical signal.

Stimulated Raman scattering is a well-known nonlinear phenomenon that can allow many conventional optical fibers to provide broadband amplification. A weak signal in the 1550-1620 nm wavelength range can be amplified by propagation in an optical fiber with strong pump radiation (typically in the 1430-1480 nm wavelength range). The higher energy pump radiation scatters off atoms in the optical fiber core, loses some energy to those atoms, and propagates down the fiber with the same wavelength as the signal. The amount of amplification provided by stimulated Raman scattering in an optical fiber is proportional to the Raman scattering coefficient of the material of the optical fiber core, and is inversely proportional to the product of the fiber's effective area and its absorption loss. One conventional method to achieve signal amplification in a dispersion compensating device is to directly pump the dispersion compensating fiber. Typical dispersion compensating fibers are effective Raman gain media due to their nonlinear nature and small effective area.

Raman pumping of the dispersion compensation fiber is not always sufficient to provide a desired amount of gain. For example, dispersion compensating devices designed to compensate for relatively short spans of transmission fiber have relatively short lengths of dispersion compensating fiber. The short length of the dispersion compensating fiber in such devices limits the amount of Raman gain that can be achieved.

SUMMARY OF THE INVENTION

One aspect of the present invention relates to a dispersion compensating device having an input and an output, the device including a dispersion compensating fiber having a dispersion more negative than about −50 ps/nm/km over a wavelength range of about 1555 nm to about 1615 nm; a Raman gain fiber having a dispersion more positive than about −40 ps/nm/km over a wavelength range of about 1555 nm to about 1615 nm; and a pump source operatively coupled to the dispersion compensating fiber and the Raman gain fiber, the pump source operating at a pump wavelength, wherein the dispersion compensating fiber has a Raman Figure of Merit at the pump wavelength, and wherein the Raman gain fiber has a Raman Figure of Merit at least about equivalent to the Raman Figure of Merit of the dispersion compensating fiber, and wherein the dispersion compensating fiber and the Raman gain fiber are arranged in series between the input and the output of the device.

Another aspect of the present invention relates to a method of amplifying and dispersion-compensating an input optical signal, the optical signal being propagated from a length of transmission fiber, the optical signal having an intensity and a positive chirp, the method yielding an output optical signal, the method including the steps of propagating the optical signal and a pump wave through a dispersion compensating fiber having a dispersion more negative than about −50 ps/nm/km over a wavelength range of about 1555 nm to about 1615 nm, and a Raman Figure of Merit; and propagating the optical signal and a pump wave through a Raman gain fiber having a Raman Figure of Merit at least about equivalent than the Raman Figure of Merit of the dispersion compensating fiber, and a dispersion of more positive than about −40 ps/nm/km over a wavelength range of about 1555 nm to about 1615 nm.

Another aspect of the present invention relates to a Raman amplification device having an input and an output, the device including a Raman gain fiber having a profile selected to provide a dispersion of between about −25 ps/nm/km and about −15 ps/nm/km at a wavelength of 1450 nm and a dispersion slope of between about 0 ps/nm²/km and about 0.05 ps/nm²/km at a wavelength of 1450 nm; and a pump source operatively coupled to the Raman gain fiber.

Another aspect of the present invention relates to a Raman amplification device having an input and an output, the device including a Raman gain fiber having a germania-doped core having an index profile having an α of between about 1.5 and about 2.5 and a radius of between about 1.8 μm and about 2.4 μm, a cladding, and a core-to-cladding Δ of at least about 1.8%; and a pump source operatively coupled to the Raman gain fiber.

The devices and methods of the present invention result in a number of advantages over prior art devices and methods. For example, the present invention provides a Raman-pumped dispersion compensating device that can simultaneously provide a desired amount of dispersion compensation and a desired amount of gain.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DEFINITIONS

The following definitions are in accord with common usage in the art.

The refractive index profile is the relationship between refractive index and optical fiber radius.

Delta, $\Delta$, is the relative refractive index percent, $\Delta = (n_i^2 - n_c^2)/2n_c^2$, where $n_i$ is the specified refractive index in region i, and $n_c$ is the average refractive index of the cladding region. Deltas are conventionally expressed as percents.

The term $\alpha$-profile refers to a refractive index profile, expressed in terms of $\Delta(b)$, where b is radius, which follows the equation $$\Delta(b) = \Delta(b_0)(1 - [|b - b_0|/(b_1 - b_0)]^\alpha)$$

where $b_0$ is the point at which $\Delta(b)$ is maximum, $b_1$ is the point at which $\Delta(b)$ % is zero, and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number.

DETAILED DESCRIPTION OF THE PREFERRED EMBODIMENTS

Figure 1:
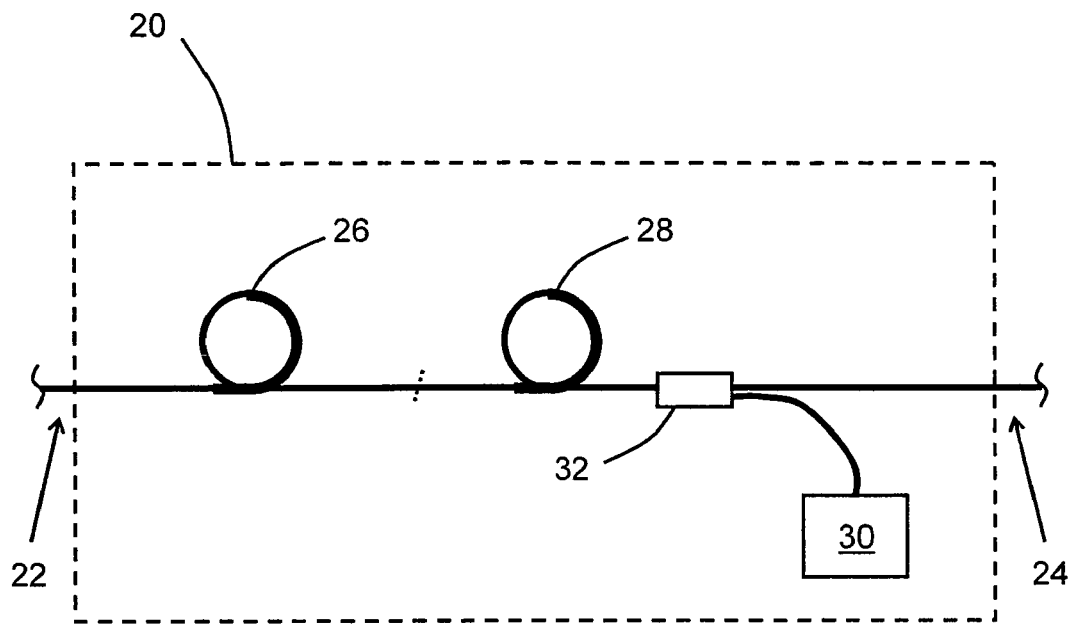
FIG. 1 is a schematic view of a dispersion compensating device according to one embodiment of the present invention.

One aspect of the present invention relates to a dispersion compensating device including a dispersion compensating fiber, a trim fiber, and a Raman gain fiber. As used herein, a dispersion compensating device may provide dispersion compensation at a single wavelength, or at a plurality of wavelengths (e.g. broadband or dispersion slope compensation.) An embodiment of the present invention is shown in schematic view in FIG. 1. A dispersion compensating device 20 has an input 22 and an output 24. A dispersion compen-sating fiber 26 and a Raman gain fiber 28 are arranged in series between the input and the output. A pump source 30 is coupled to the Raman gain fiber through a WDM coupler 32. In this configuration, the pump source 30 is configured so that it provides a counterpropagating pump signal 34. The pump source operates at a pump wavelength (e.g. 1457 nm), and may be, for example, a pump laser. As the pump signal propagates through the Raman gain fiber 28 and into the dispersion compensating fiber 26, the pump source 30 may be said to be operatively coupled to both the Raman gain fiber and the dispersion compensating fiber.

The dispersion compensating fiber 26 has a dispersion of more negative than about −50 ps/nm/km over a wavelength range of about 1555 nm to about 1615 nm. In certain embodiments of the invention, the dispersion compensating fiber 26 may have a dispersion slope more negative than −1.5 ps/nm²/km at 1575 nm. The Raman gain fiber has a dispersion more positive than about −40 ps/nm/km over a wavelength range of about 1555 nm to about 1615 nm.

The Raman gain fiber has a Raman Figure of Merit at least about equivalent to the Raman Figure of Merit of the dispersion compensating fiber at the pump wavelength. The Raman Figure of Merit is defined by the equation $$\text{Raman Figure of Merit} = \frac{g_R}{A_{\text{eff}} \cdot \text{Att}'n},$$

where $g_R$ is the Raman scattering coefficient of the material of the core of the optical fiber, Aeff is the effective area of the fiber at the pump wavelength, and Att'n is the attenuation of the fiber at the pump wavelength in units of km$^{-1}$. The value of $g_R$ relates to the probability of a photon being scattered in a Raman process, and is strongly dependent on the composition of the material; increasing the germania content of a material tends to increase its $g_R$. The attenuation in units of km$^{-1}$ may be calculated by dividing the attenuation in dB/km by $10 \log_{10}(e)$ (about 4.34). The Raman Figure of Merit for an optical fiber may be determined from the equation describing the signal gain in a Raman-pumped optical fiber:

$$G = \exp\left(\frac{g_R \cdot P}{A_{\text{eff}} \cdot \text{Att}'n}(1 - \exp(-\text{Att}'n \cdot L))\right)$$

where G is the signal gain, $g_R$, $A_{\text{eff}}$ and Att'n are as described above, P is the Raman pump power launched into the fiber, and L is the length of the fiber. The skilled artisan may measure the signal gain for a given Raman pump power in a length of fiber and manipulate the equations given above to determine the Raman Figure of Merit. Such procedures are described by Gray in "Raman Gain Measurements in Optical Fibers," *Technical Digest: Symposium on Optical Fiber Measurements* 2000, NIST Special Publication 953, at page 151, which is incorporated herein by reference in its entirety. Dispersion compensating fibers typically used to compensate the dispersion of LEAF® have Raman Figures of merit greater than about 10 W$^{-1}$ (e.g. 15 W$^{-1}$). In desirable embodiments of the invention, the Raman Figure of Merit of the Raman gain fiber is at least about 10 W$^{-1}$ at the pump wavelength (e.g. 1457 nm). In especially desirable embodiments of the present invention, the Raman Figure of Merit of the Raman gain fiber is at least about 18 W$^{-1}$ at the pump wavelength (e.g. 1457 nm).

In operation, a weak, broadened input optical signal 36 enters the device at input 22, is amplified and compressed in dispersion compensating fiber 26, is further amplified in Raman gain fiber 28, and exits the device as an amplified, compressed output optical signal 38. The skilled artisan may select appropriate lengths and properties of the dispersion compensating fiber 26 and the Raman gain fiber to provide both a desired dispersion compensation and a desired gain. The Raman gain fiber may have negative or positive dispersion; the skilled artisan will take into account any dispersion of the Raman gain fiber in designing the device.

In order to simplify the interplay between the dispersion of the dispersion fiber and of the Raman gain fiber, it may be desirable for the Raman gain fiber to have a dispersion slope of between about −0.05 ps/nm$^2$/km and about 0.05 ps/nm$^2$/km over a wavelength range of about 1555 nm to about 1615 nm. It may also be desirable for the Raman gain fiber to have a dispersion of more positive than about −25 ps/nm/km over a wavelength range of about 1555 nm to about 1615 nm. Further, in order to suppress the effects of four-wave mixing resulting from high power pumping over a broad wavelength range, it may be desirable for the Raman gain fiber to have a moderate dispersion at the pump wavelength (e.g. absolute value between about 15 ps/nm/km and about 25 ps/nm/km). It is also desirable for the Raman gain fiber to have a zero-dispersion wavelength at least 50 nm greater than the pump wavelength. In especially desirable embodiments of the present invention, the Raman gain fiber has a zero-dispersion wavelength at least 100 nm greater than the pump wavelength. For example, suitable Raman gain fibers may have zero-dispersion wavelength of at least about 1580 nm. Especially suitable Raman gain fibers have a core-to-cladding deltas of at least about 1.8%, and core radii of between about 1.8 μm and about 2.4 μm. One example of a suitable Raman gain fiber is described below in more detail in connection with FIG. 7.

Figure 2:
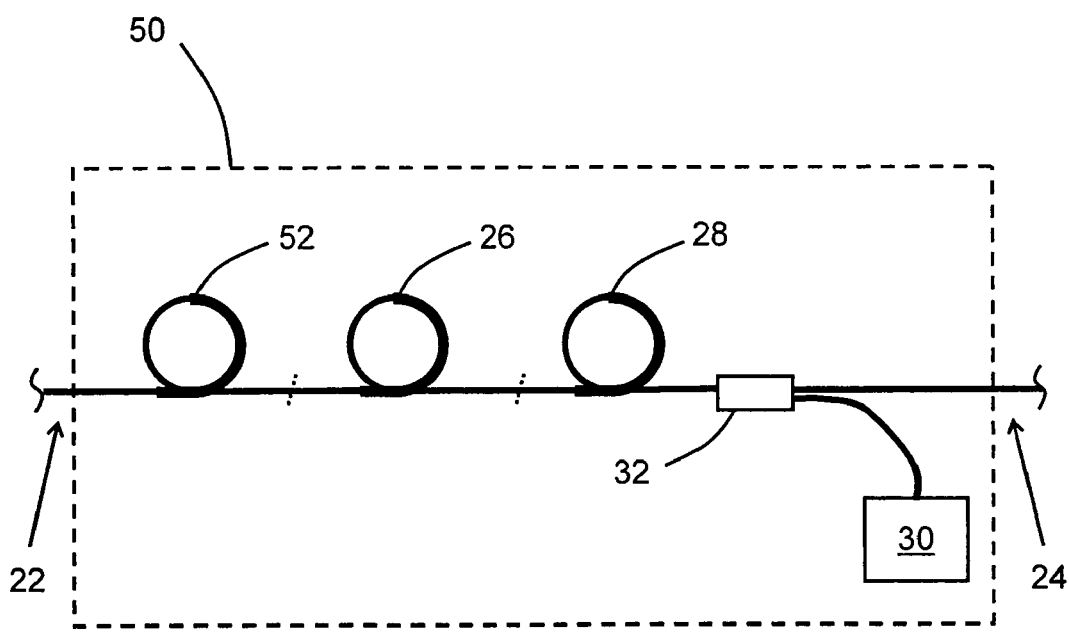
FIG. 2 is a schematic view of a dispersion compensating device according to one embodiment of the present invention.

Another embodiment of the present invention is shown in schematic view in FIG. 2. The dispersion compensating device 50 includes an input 22, and output 24, a dispersion compensating fiber 26, and a Raman gain fiber 28 substantially as described above in connection with FIG. 1. The dispersion compensating device 50 further comprises a trim fiber 52 having substantially different dispersion properties (e.g. dispersion and/or dispersion slope) than the dispersion compensating fiber 26 and the Raman gain fiber 28. The use of the trim fiber allows the skilled artisan to maximize the compensation of the dispersion and dispersion slope of a transmission link in cases when the dispersion compensating fiber and Raman gain fiber are unable to do so alone. The trim fiber may have, for example, a positive dispersion (e.g. greater than about 8 ps/nm/km) and a positive dispersion slope (e.g. between about 0 ps/nm$^2$/km and about 0.15 ps/nm$^2$/km). The trim fiber need not provide Raman gain, and need not be operatively coupled to the pump laser. For example, SMF-28® (available from Corning Incorporated of Corning, N.Y.), which provides very little Raman gain, can be used as the trim fiber. In certain embodiments of the invention, however, the trim fiber may provide Raman gain, and may be coupled to the pump laser. Use of a trim fiber for residual dispersion trimming is described, for example, in U.S. patent application Ser. No. 10/113,448, which is incorporated herein by reference. In the embodiment of the invention shown in FIG. 2, the trim fiber 52 is at the input of the device, the Raman gain fiber 28 is at the output of the device, and the dispersion compensating fiber 26 is between the trim fiber and the Raman gain fiber.

The present invention is especially useful when the dispersion compensating device is designed to compensate a relatively short span of transmission fiber, and therefore has a relatively short length of dispersion compensating fiber. In advantageous embodiments of the present invention, the dispersion compensating fiber has a length of less than about 3 km. In especially advantageous embodiments of the present invention, the dispersion compensating fiber has a length of less than about 2 km.

As described above, the dispersion compensating devices of the present invention may be Raman pumped to provide gain. The skilled artisan will appreciate that a pump laser may be configured to provide co-pumping, counterpumping or co-counterpumping of the Raman gain fiber and the dispersion compensating fiber. The gain will depend on the properties of the dispersion compensating fiber and the Raman gain fiber, the lengths of the dispersion compensating fiber and the Raman gain fiber, and the wavelength and power of the pump signal.

Figure 3:
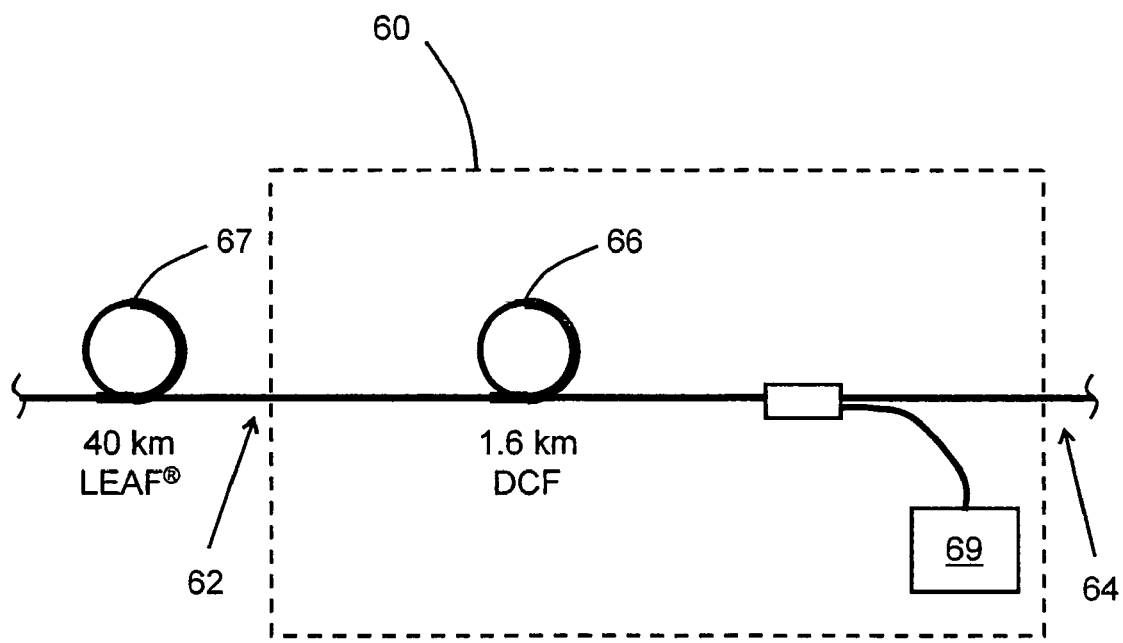
FIG. 3 is a schematic view of a conventional Raman-pumped dispersion compensating device.
Figure 4:
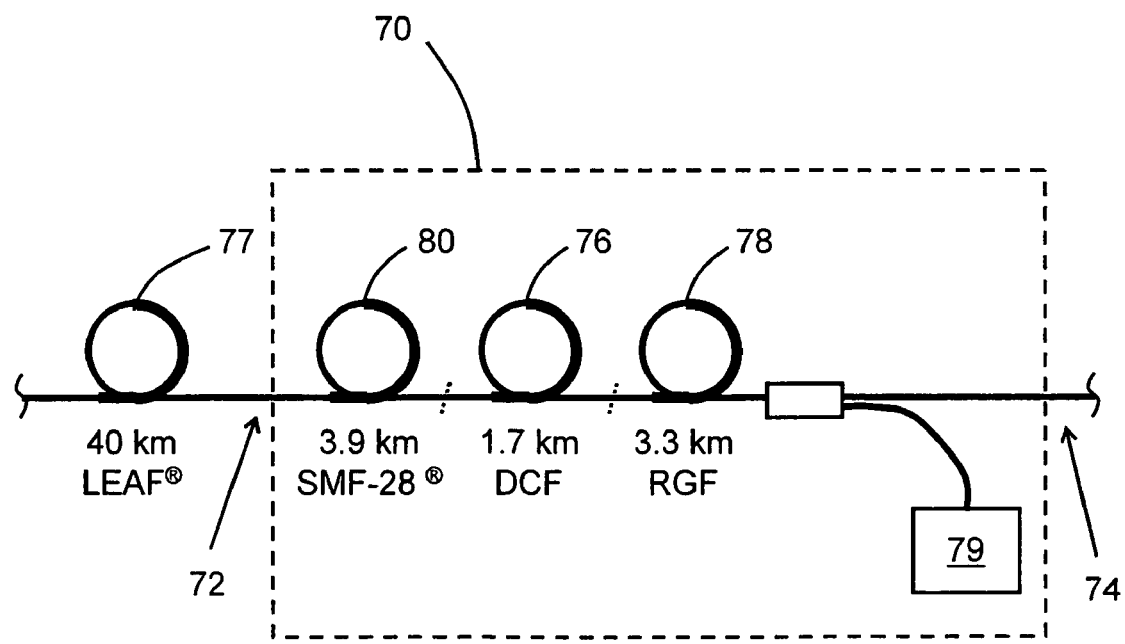
FIG. 4 is a schematic view of a Raman-pumped dispersion compensating device according to the present invention.

FIG. 3 is a schematic diagram of a conventional device suitable for compensating the dispersion of a span of 40 km of LEAF® optical fiber, available from Corning Incorporated of Corning, N.Y. The conventional device 60 includes an input 62, and output 64, and a 1.6 km length of a suitable dispersion compensating fiber 66 coupling the input to the output. The dispersion compensating fiber is operatively coupled to a pump laser 69 operating in the 1430-1480 nm wavelength range. The 40 km span of LEAF® 67 is coupled to the input 62 of the device. FIG. 4 is a schematic diagram of an example of a device suitable for compensating the dispersion of a span of 40 km of LEAF® according to the present invention. Device 70 includes input 72, output 74, with 1.7 km of the dispersion compensating fiber 76, 3.3 km of the Raman gain fiber 78 described below in connection with FIG. 7, and 3.9 km of single mode fiber 80 (SMF-28®) connected in series between the input and the output. The Raman gain fiber is described in more detail hereinbelow. The dispersion compensating fiber and the Raman gain fiber are operatively coupled to a pump laser 79 operating in the 1430-1480 nm window. The 40 km span of LEAF® 77 is coupled to the input 72 of the device. Table 1 shows the dispersion properties of LEAF®, SMF-28®, and the dispersion compensating fiber (DCF) and Raman gain fiber (RGF) used in the examples of FIGS. 3 and 4 over a wavelength range of 1555 nm-1615 nm.

TABLE 1

| | Dispersion values (in ps/nm/km) for optical fibers | | | | | | |
|---|---|---|---|---|---|---|---|
| | 1555 nm | 1565 nm | 1575 nm | 1585 nm | 1595 nm | 1605 nm | 1615 nm |
| LEAF ® | 5.0 | 5.8 | 6.7 | 7.5 | 8.4 | 9.2 | 10.1 |
| DCF | −124.3 | −141.6 | −161.4 | −183.5 | −207.2 | −231.5 | −254.8 |
| RGF | −17.2 | −16.8 | −16.5 | −16.1 | −15.7 | −15.4 | −15.0 |
| SMF-28 ® | 16.4 | 17.0 | 17.6 | 18.1 | 18.7 | 19.2 | 19.8 |

Figure 5:
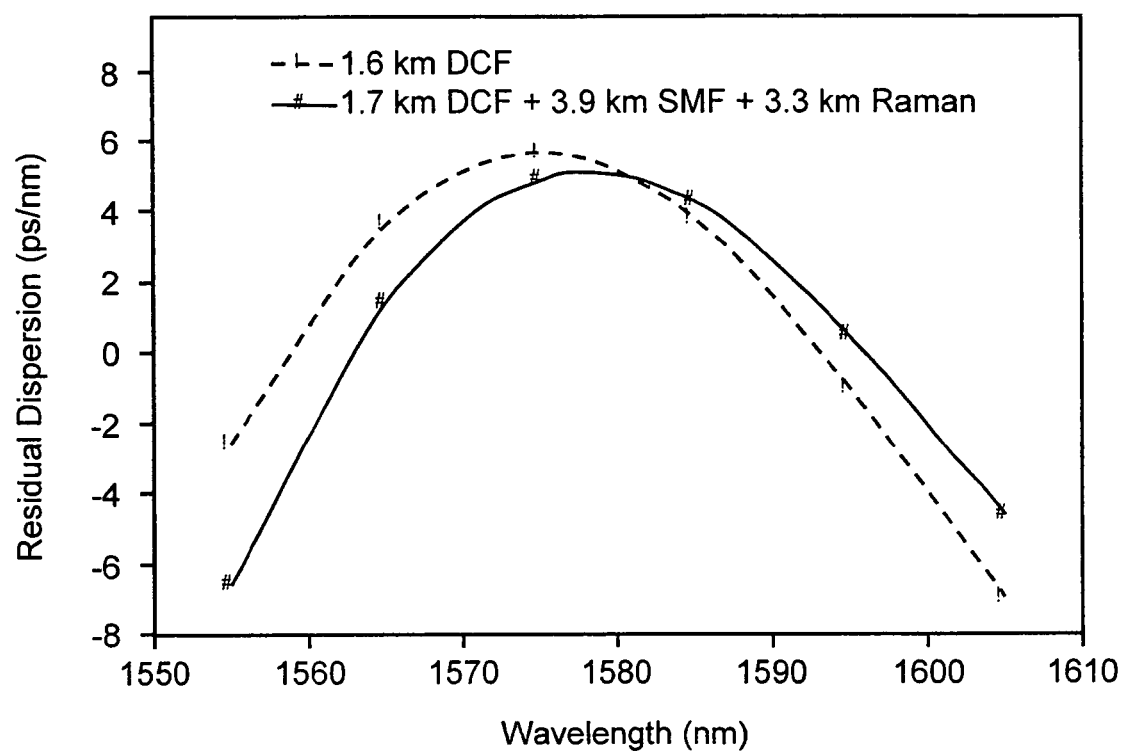
FIG. 5 is a graph of residual dispersion vs. wavelength for the devices of FIG. 3 and FIG. 4.

FIG. 5 shows the calculated residual dispersion of the 1555-1615 wavelength band after propagation through 40 km of LEAF® and the devices of FIG. 3 and FIG. 4. The conventional device 60 and the device 70 of the present invention both provide adequate dispersion compensation. Due to its additional length of Raman gain fiber, the device 70 of the present invention can provide at least about three times as much Raman gain as does the conventional device 60.

In selecting lengths of dispersion compensating fibers, trim fibers, and Raman gain fibers for use in the present invention, the skilled artisan may wish to use numerical optimization of the residual dispersion of the transmission link-dispersion compensating device pair. In order to maximize the dispersion compensation, it is desirable to minimize the sum of the dispersion of the transmission link and the dispersion of the dispersion compensating device:

$$L_T \cdot D_T(\lambda) + L_{DCF} \cdot D_{DCF}(\lambda) + L_{RGF} \cdot D_{RGF}(\lambda) + L_{TF} \cdot D_{TF}(\lambda) \approx 0 \text{ ps/nm/km}$$

where $L_T$, $L_{DCF}$, $L_{RGF}$ and $L_{TF}$ are the lengths of the transmission fiber, the dispersion compensating fiber, the Raman gain fiber, and the trim fiber, respectively, and $D_T(\lambda)$, $D_{DCF}(\lambda)$, $D_{RGF}(\lambda)$, and $D_{TF}(\lambda)$ are the dispersions per unit length as a function of wavelength. The Raman gain of the device may be chosen by selecting the sum of the lengths of the dispersion compensating fiber and the Raman gain fiber ($L_{DCF} + L_{RGF}$). In desirable embodiments of the present invention, the absolute value of the residual dispersion is less than about 10% of the absolute value of the dispersion caused by the length of transmission fiber over a wavelength range of about 1555 nm to about 1615 nm. In especially desirable embodiments of the present invention, the absolute value of the residual dispersion is less than about 5% of the absolute value of the dispersion caused by the length of transmission fiber over a wavelength range of about 1555 nm to about 1615 nm. For example, in the example of FIGS. 4 and 5, the 40 km of LEAF® causes a dispersion of about 200 ps/nm at 1555 nm, and about 404 ps/nm at 1615 nm. The absolute value of the residual dispersion at 1555 nm after propagation through the device of FIG. 4 is about 7 ps/nm, which is less than about 4% of the dispersion caused by the length of LEAF®. The absolute value of the residual dispersion at 1615 nm is about −5 ps/nm, which is less than 2% of the dispersion caused by the length of LEAF®.

For use in the field, it may be desirable for the dispersion compensating devices of the present invention to include an enclosure for the optical fibers. The dispersion compensating fiber, Raman gain fiber, and (if used) trim fiber are connected in series inside the enclosure. The pump source may be included in the enclosure, or may be in a separate enclosure.

Figure 6:
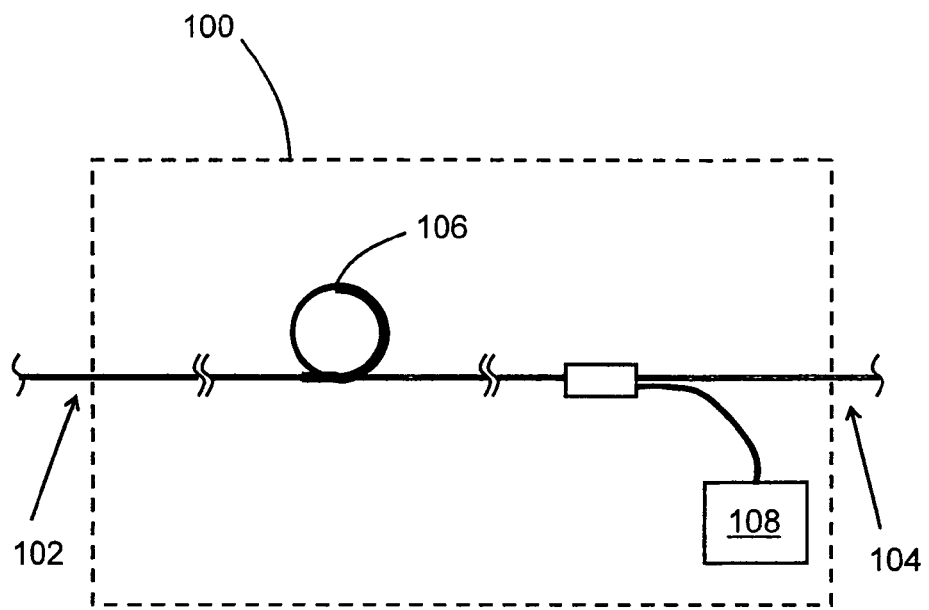
FIG. 6 is a schematic view of a Raman amplification device according to one embodiment of the present invention.
Figure 7:
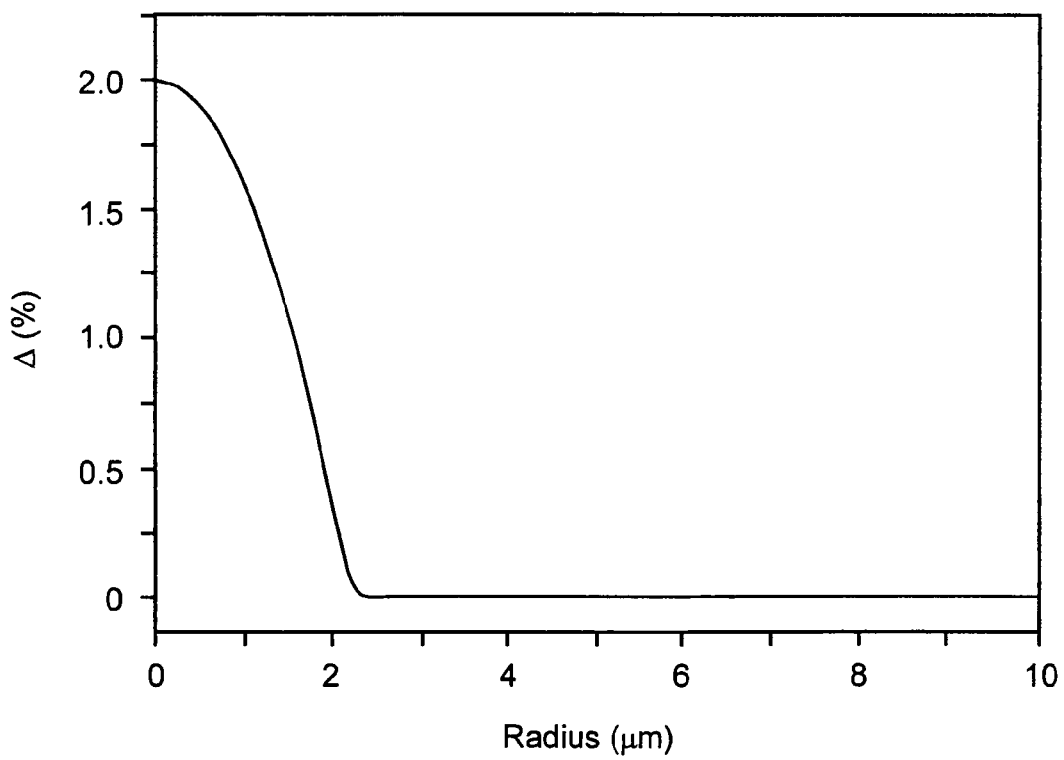
FIG. 7 is a profile of a Raman gain fiber according to one embodiment of the present invention.

Another aspect of the present invention provides a Raman gain fiber suitable for use in Raman amplifiers and in Raman-pumped dispersion compensating devices. According to one embodiment of the invention, shown in schematic view in FIG. 6, a Raman amplification device 100 having an input 102 and an output 104 includes a length of a Raman gain fiber 106 between the input and the output, and a pump laser 108 operatively coupled to the Raman gain fiber. The Raman gain fiber 106 has a germania-doped silica core having an α-profile with an α of between about 1.5 and about 3, and a peak core Δ of at least about 1.8%. An example of a Raman gain fiber profile according to this embodiment of the invention is shown in FIG. 7. The core radius is between about 1.8 and about 2.4 microns. In desirable embodiments of the invention, the cladding has a substantially uniform refractive index within about 20 microns of the core, as shown in FIG. 7.

In order to provide increased Raman gain, it is desirable for the Raman gain fiber to have an effective area of no greater than about 19 μm² at a wavelength of 1450 nm, and a Raman figure of merit of at least about 18 W⁻¹ at 1457 nm. Desirable Raman gain fibers have low attenuation losses at both the pump and signal wavelengths (e.g. less than about 0.8 dB/km at both 1450 nm and 1550 nm). In order to suppress the effects of four wave mixing in the wavelength range of the pump laser, it is desirable for the Raman gain fiber to have a moderate negative dispersion (e.g. between about −25 ps/nm/km and about −15 ps/nm/km at a wavelength of 1450 nm) and a low positive dispersion slope (e.g. between about 0 ps/nm²/km and about 0.05 ps/nm²/km at a wavelength of 1450 nm).

As will be evident to the skilled artisan, the Raman gain fiber of the present invention may be pumped using any appropriate pumping scheme. For example, the Raman gain fiber may be co-pumped, counterpumped, or co-counter-pumped. A WDM coupler may be used to introduce the pump signal into the Raman gain fiber. The Raman gain fiber and the pump laser may be arranged inside an enclosure for use in the field.

A Raman gain fiber having the index profile of FIG. 7 was fabricated using standard OVD techniques. The properties of this fiber are shown in Table 2.

TABLE 2

Properties of an example of a Raman gain fiber

| Property | Value |
| --- | --- |
| Dispersion at 1450 nm | −21.6 ps/nm/km |
| Dispersion at 1550 nm | −17.2 ps/nm/km |
| Dispersion slope at 1450 nm | 0.043 ps/nm2/km |
| Dispersion slope at 1550 nm | 0.042 ps/nm2/km |
| Effective area at 1450 nm | 15.3 μm² |
| Effective area at 1550 nm | 17.5 μm² |
| Mode field diameter at 1450 nm | 4.41 μm |
| Mode field diameter at 1550 nm | 4.72 μm |
| Attenuation at 1450 nm | 0.595 dB/km |
| Attenuation at 1550 nm | 0.458 dB/km |
| Single mode cutoff | 1146 nm |
| Polarization mode dispersion | 0.033 ps/$\sqrt{km}$ |
| Raman Figure of Merit (1457 nm pump wavelength) | 24.0 W⁻¹ |

As will be evident to the skilled artisan, the Raman gain fiber of the present invention may be pumped using any appropriate pumping scheme. For example, the Raman gain fiber may be co-pumped, counterpumped, or co-counter-pumped. The Raman gain fiber according to this aspect of the invention is particularly useful in the dispersion compensating devices described hereinabove.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A Raman amplification device having an input and an output, the device comprising:
   (i) a Raman gain fiber having a profile selected to provide a dispersion of between 25 ps/nm/km and −15 ps/nm/km at a wavelength of 1450 nm and a dispersion slope of between 0 ps/nm²/km and 0.05 ps/nm²/km at a wavelength of 1450 nm, wherein said Raman gain fiber has a germania-doped core having an index profile having an α of between 1.5 and 2.5 and a radius of between 1.8 μm and 2.4 μm,
   a cladding, and
   a core-to-cladding Δ of at least 1.8%; and
   a pump source operatively coupled to the Raman gain fiber.

2. The Raman amplification device of claim 1 wherein the Raman gain fiber has an effective area of no greater than 19 µm² at a wavelength of 1450 nm and a Raman Figure of Merit of at least 18 W⁻¹ at a wavelength of 1457 nm.

3. The Raman amplification device of claim 1 wherein the Raman gain fiber has an attenuation of less than 0.8 dB/km at 1450 nm and an attenuation of less than 0.8 dB/km at 1550 nm.

4. A Raman amplification device having an input and an output, the device comprising:
 a Raman gain fiber having
  a germania-doped core having an index profile having an α of between 1.5 and 2.5 and a radius of between 1.8 µm and 2.4 µm,
  a cladding, and
  a core-to-cladding α of at least 1.8%; and
 a pump source operatively coupled to the Raman gain fiber, wherein the Raman gain fiber has
 a dispersion of between −25 ps/nm/km and −15 ps/nm/km at a wavelength of 1450 nm and a dispersion slope of between 0 ps/nm²/km and 0.05 ps/nm²/km at a wavelength of 1450 nm and an effective area of between 15 µm² and 19 µm² at a wavelength of 1450 nm.

\* \* \* \* \*